United States Patent [19]

Haruna et al.

[11] Patent Number: 5,039,723
[45] Date of Patent: Aug. 13, 1991

[54] STABILIZED SYNTHETIC RESIN COMPOSITION

[75] Inventors: Tohru Haruna, Saitama; Kazunori Nishikawa, Chiba, both of Japan

[73] Assignee: Adeka Argus Chemical Co., Ltd., Tokyo, Japan

[21] Appl. No.: 388,680

[22] Filed: Jul. 31, 1989

[30] Foreign Application Priority Data

Sep. 16, 1988 [JP] Japan ........................ 231638

[51] Int. Cl.$^5$ .................. C08K 5/345; C08K 5/524
[52] U.S. Cl. .............................. 524/97; 524/99; 524/100; 524/102; 524/103; 524/117; 524/155
[58] Field of Search .................. 524/117, 97, 99, 100, 524/102, 103, 155

[56] References Cited

U.S. PATENT DOCUMENTS 4,110,306  8/1978  Minagawa et al. .............. 524/99
4,196,117  4/1980  Spivack ........................... 524/117

Primary Examiner—Kriellion Morgan
Attorney, Agent, or Firm—Frishauf, Holtz, Goodman & Woodward

[57] ABSTRACT

A synthetic resin composition stabilized particularly against the deterioration caused by the action of heat and light, which comprises 100 parts by weight of a synthetic resin, 0.001 to 10 parts by weight of a cyclic phosphite compound represented by the following general formula (I) and 0.001 to 10 parts by weight of a hindered amine compound having a group represented by the following general formula (II) in its molecule:

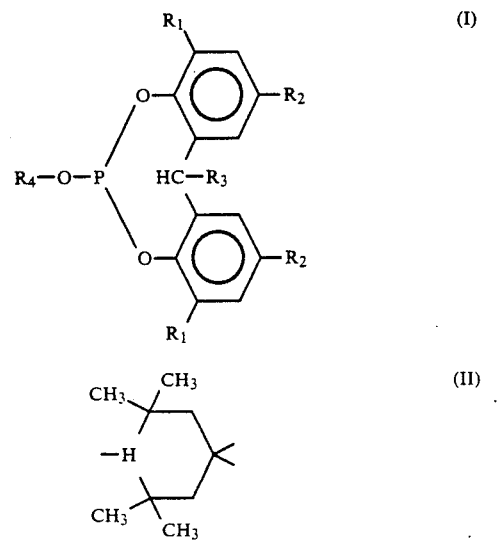

wherein $R_1$ stands for a tert-butyl or tert-amyl group; $R_2$ stands for a $C_{1\sim 9}$ alkyl group; $R_3$ stands for a hydrogen atom or a $C_{1\sim 4}$ alkyl group and $R_4$ stands for a $C_{1\sim 30}$ alkyl group.

24 Claims, No Drawings

STABILIZED SYNTHETIC RESIN COMPOSITION

BACKGROUND OF THE INVENTION

1. Field of the Invention

The present invention relates to a stabilized synthetic resin composition. Particularly, it relates to a synthetic resin composition which is stabilized against the deterioration caused by the action of heat or light by adding a specific cyclic phosphite and a hindered amine light stabilizer.

2. Description of the Prior Art

It is known that a synthetic resin such as polyethylene, polypropylene, ABS resin or polyvinyl chloride resin is unfit for long-term service, because it is deteriorated by the action of heat or light to cause discoloration or lowering in the mechanical strengths.

In order to prevent the above deterioration of a synthetic resin, many additives have been used alone or as various combinations. Particularly, a phosphite compound is known to have a relatively large effect upon the improvement in the heat resistance of a synthetic resin and the depression of the discoloration thereof. Such a phosphite compound includes triorganic phosphites such as trialkyl phosphites, triaryl phosphites and alkyl aryl phosphites and acid phosphites which are corresponding to the compounds obtained by replacing one of the organic groups of the organic triphosphite by a hydroxyl group. However, these phosphite compounds are unsatisfactory for practical use, because the stabilizing effect thereof is insufficient and the water resistance thereof is poor.

Among the organic phosphite compounds described above, a cyclic phosphite compound of a bisphenol is relatively excellent in stabilizing effect and water resistance. For example, U.S. Pat. No.3297631 discloses 2,2'-methylenebis(dialkylphenyl) phosphite. However, this compound is also poor in stabilizing effect and fails to provide satisfactory practical use.

Further, as compounds more desirable than the phosphite compounds described above, Japanese Patent Laid-Open No.100391/1979 discloses cyclic phosphites of o-bisphenol, while Japanese Patent Laid-Open Nos.114595/1982 and 103537/1983 disclose cyclic phosphites of 2,2'-bisphenol. However, these compounds also exhibit only an unsatisfactory stabilizing effect and are further disadvantageous in that the process for the preparation thereof is complicated. Accordingly, they have not been practically used as yet.

Meanwhile, in order to prevent a synthetic resin from deteriorating in the hue or lowering in the mechanical strengths caused by irradiation with light, ultraviolet absorbers such as benzophenone, benzotriazole, benzoate or cyanoacrylate or light stabilizers such as hindered amine have been used alone or as a mixture of two or more of them. However, many of these compounds stain a resin and are poor in the effect, so that the development of a more desirable stabilizer has been expected.

Among the compounds described above, hindered amine compounds having a tetramethylpiperidyl group have recently been noted, because they are non-staining and exhibit a relatively large effect upon the light stabilization of a synthetic resin. Therefore, many hindered amine compounds of such a type have been proposed. However, when such a hindered amine compound is used alone, the effect is insufficient, particularly unsatisfactory at all for uses wherein long-term resistance to heat and light is necessitated.

Further, Japanese Patent Laid-Open No.66551/1977 discloses that the resistance of a synthetic resin to heat and light is improved by using a combination of a hindered amine light stabilizer and one of various phosphites. However, such a combination does not give an effect satisfactory enough to be used practically, so that the development of a combination of stabilizers having a more desirable effect has been expected.

SUMMARY OF THE INVENTION

An object of the present invention is to provide a synthetic resin composition which is stabilized against the deterioration caused by the action of heat or light.

Under the abovementioned circumstances, the inventors of the present invention have intensively studied to find out a combination of stabilizers which can remarkably improve the resistance of a synthetic resin to heat and light and have found that this object can be attained by simultaneously using a cyclic phosphite of 2,2'-alkylidenebisphenol together with a hindered amine light stabilizer.

The present invention has been accomplished on the basis of this finding and it provides a stabilized synthetic resin composition comprising 100 parts by weight of a synthetic resin, 0.001 to 10 parts by weight of a compound represented by the general formula (I) and 0.001 to 10 parts by weight of a hindered amine compound having a group represented by the general formula (II) in its molecule:

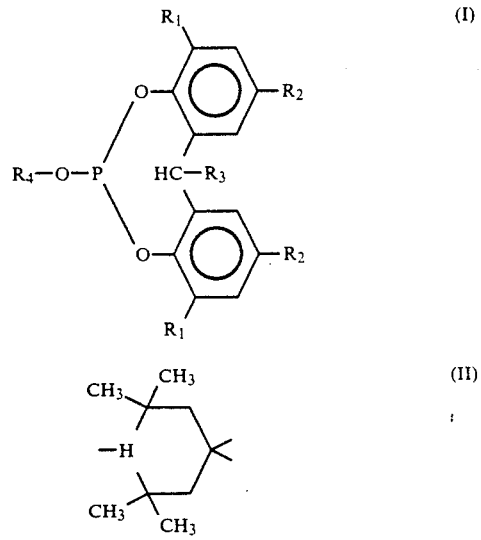

wherein $R_1$ stands for a tert-butyl or tert-amyl group; $R_2$ stands for a $C_{1\sim9}$ alkyl group; $R_3$ stands for a hydrogen atom or a $C_{1\sim4}$ alkyl group and $R_4$ stands for a $C_{1\sim30}$ alkyl group.

The synthetic resin composition according to the present invention is stabilized particularly against the deterioration caused by the action of heat or light.

DETAILED DESCRIPTION OF THE INVENTION

The $C_{1\sim9}$ alkyl group defined with respect to $R_2$ of the general formula (I) includes methyl, ethyl, propyl, isopropyl, butyl, sec-butyl, tert-butyl, isobutyl, amyl, tert-amyl, hexyl, heptyl, octyl, isooctyl, 2-ethylhexyl, tert-octyl, nonyl and tertnonyl groups. The $C_{1-4}$ alkyl group defined with respect to $R_3$ includes methyl, ethyl, propyl, isopropyl, butyl, sec-butyl, tert-butyl and isobutyl groups. The $C_{1-30}$ alkyl group defined with respect to $R_4$ includes methyl, ethyl, propyl, isopropyl, butyl, sec-butyl, tert-butyl, isobutyl, amyl, tertamyl, hexyl, heptyl, octyl, isooctyl, 2-ethylhexyl, tert-octyl, nonyl, tert-nonyl, decyl, isodecyl, dodecyl, tetradecyl, hexadecyl, octadecyl, eicosyl, docosyl, tetracosyl and triacontyl groups.

Representative examples of the phosphite represented by the general formula (I) are as follows.

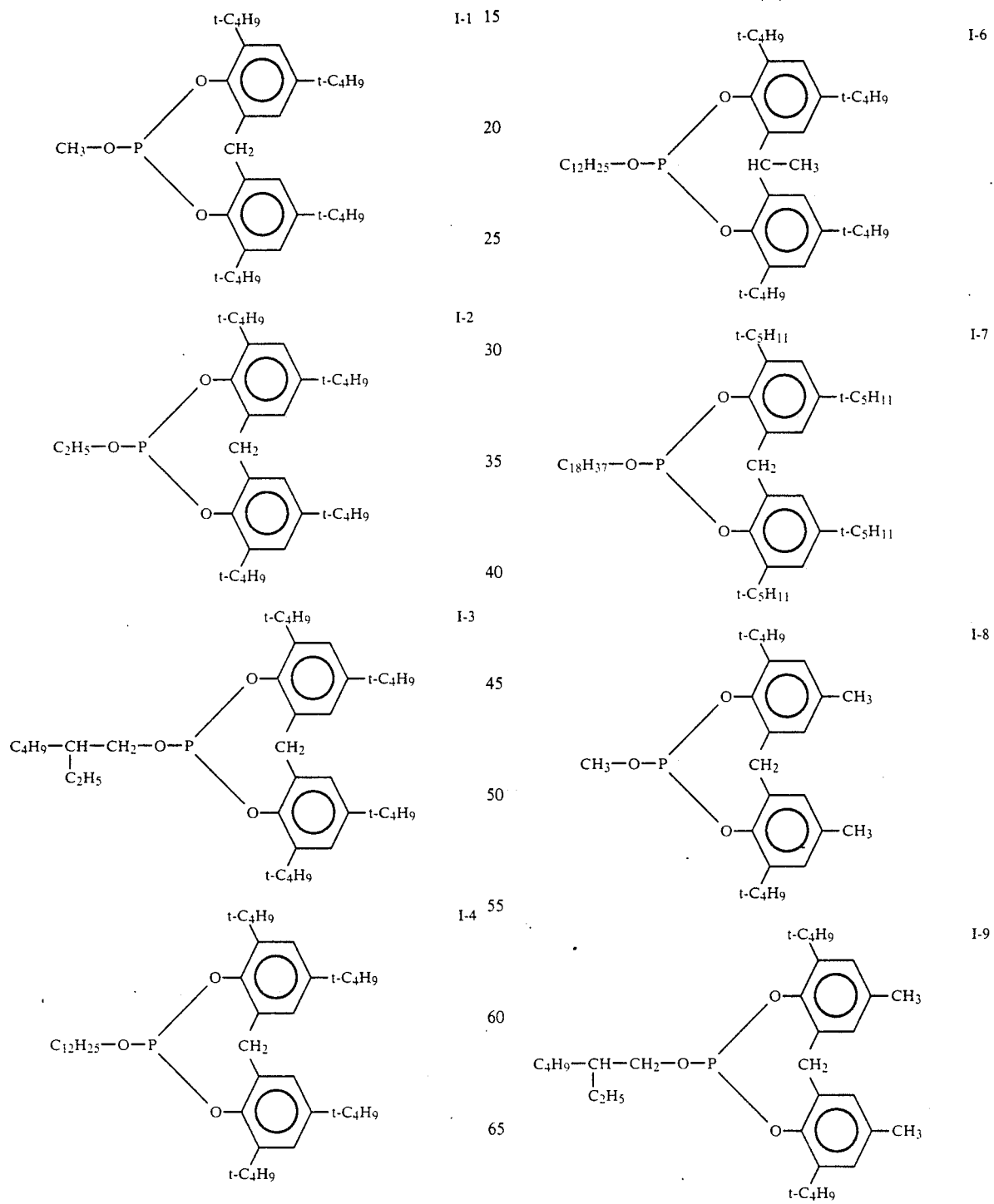

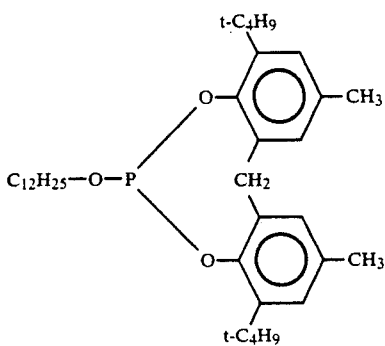

I-10

The compound represented by the general formula (I) to be used in the present invention can be easily prepared by reacting 2,2′-alkylidenebisphenol with phosphorus trichloride to obtain a compound of the general formula (I) wherein the R4—O—group is a chlorine atom and reacting the compound with an alcohol represented by the general formula: R4—OH.

Synthesis Example of preparing a phosphite compound represented by the general formula (I) will now be described.

SYNTHESIS EXAMPLE

Synthesis of 2,2′-methylenebis(4,6-di-t-butylphenyl) stearyl phosphite (Compound I-5)

42.5 g of 2,2′-methylenebis(4,6-di-t-butylphenol), 100 g of toluene and 0.86 g of triethylamine were fed into a 500ml four-necked flask. 16.5 g of phosphorus trichloride was dropwise added to the flask at 60 to 65° C. under stirring. After the completion of the dropwise addition, the temperature of the contents was gradually raised in a stream of nitrogen and the resulting mixture was stirred under reflux for 2 hours.

Excessive phosphorus trichloride was distilled off in a vacuum and the residual mixture was cooled to 60° C., followed by the addition thereto of 12.1 g of triethylamine and 27 g of stearyl alcohol. The obtained mixture was stirred at 80° C. for 4 hours, cooled and filtered to remove the formed triethylamine hydrochloride. The filtrate was distilled to remove the solvent.

The residue was recrystallized from methanol to give a white powdery product having a melting point of 65° C. The IR and $H^1$—NMR spectra of the product are as follows:

IR (cm$^{-1}$)
2925, 2850: methylene, 1230, 1200: tert-butyl,
1100: -O-phenyl, 1020: P-O-alkyl,
840: P-O-phenyl
$H^1$—NMR (in CDCl$_3$, 60 MHz, TMS as internal reference)
δ value;
0.8: 3H, t, methyl group (terminal of stearyl group),
1.2 to 1.3: 73H, sss, tert-butyl group and stearyl group;
3.2 to 4.4: 4H, dd, methylene group and —O—CH$_2$—,
7.2: 4H, s, aromatic hydrogen.

The phosphite compound represented by the general formula (I) is used in an amount of 0.001 to 10 parts by weight, preferably 0.01 to 3 parts by weight per 100 parts by weight of a synthetic resin.

Preferred examples of the hindered amine having a group represented by the general formula (II) to be used in the present invention include 1-substituted or unsubstituted 2,2,6,6-tetramethyl-4-piperidinol derivatives and 1-substituted or unsubstituted 2,2,6,6-tetramethyl-4-piperidylamine derivatives.

Particular examples of the former include esters of 1-substituted or unsubstituted 2,2,6,6-tetramethyl-4-piperidinol with mono- to poly-carboxylic acids and these esters may be partial esters further comprising other monohydric alcohol or polyesters further comprising polyhydric alcohol. Further, they may be polyesters of 1-(2-hydroxyethyl)-2,2,6,6-tetramethyl-4-piperidinol with polycarboxylic acid.

Particular examples of the latter include amides and imides of 1-substituted or unsubstituted 2,2,6,6-tetramethyl-4-piperidylamine with mono- to polycarboxylic acids; condensates of said piperidylamine with cyanuric chloride and, if necessary, polyamine and bis(2,2,6,6-tetramethyl-4-piperidylamino)alkanes. Further, condensates of bis(2,2,6,6-tetramethyl-4-piperidylamino)alkane with 2-substituted-4,6-dichloro-s-triazine or dihalogenoalkane are also preferred. Representative examples of the hindered amine compound are as follows:

II-1  2,2,6,6-tetramethyl-4-piperidyl benzoate
II-2  2,2,6,6-tetramethyl-4-piperidyl stearate
II-3  1,2,2,6,6-pentamethyl-4-piperidyl stearate
II-4  bis(2,2,6,6-tetramethyl-4-piperidyl) sebacate
II-5  bis(1,2,2,6,6-pentamethyl-4-piperidyl) sebacate
II-6  bis(1,2,2,6,6-pentamethyl-4-piperidyl) 2-butyl -2-(3,5-di-t-butyl-4-hydroxybenzyl)malonate
II-7  tetra(2,2,6,6-tetramethyl-4-piperidyl) 1,2,3,4-butanetetracarboxylate
II-8  tetra(1,2,2,6,6-pentamethyl-4-piperidyl) 1,2,3,4-butanetetracarboxylate
II-9  bis(2,2,6,6-tetramethyl-4-piperidyl) di(tridecyl) 1,2,3,4-butanetetracarboxylate
II-10  bis(1,2,2,6,6-pentamethyl-4-piperidyl) di(tridecyl) 1,2,3,4-butanetetracarboxylate
II-11  3,9-bis[1,1-dimethyl-2-{2,3,4-tris(2,2,6,6-tetramethyl-4-piperidyloxycarbonyl)butylcarbonyloxy}ethyl]-2,4,8,10-tetraoxaspiro[5.5]undecane
II-12  3,9-bis[1,1-dimethyl-2-{2,3,4-tris(1,2,2,6,6-pentamethyl-4-piperidyloxycarbonyl)butylcarbonyloxy}ethyl]-2,4,8,10-tetraoxaspiro[5.5]undecane
II-13  1-[2-{8-(3,5-di-t-butyl-4-hydroxyphenyl)propionyloxy}ethyl]-2,2,6,6-tetramethyl-4-piperidyl β-(3,5-di-t-butyl-4-hydroxyphenyl)propionate
II-14  condensate of 1-(2-hydroxyethyl)-2,2,6,6-tetramethyl-4-piperidinol with dimethyl succinate
II-15  N(2,2,6,6-tetramethyl-4-piperidyl)-2-(2,2,6,6-tetramethyl-4-piperidylamino)isobutyramide
II-16  N-(2,2,6,6-tetramethyl-4-piperidyl)dodecylsuccinimide
II-17  1,6-bis(2,2,6,6-tetramethyl-4-piperidylamino)hexane
II-18  1,5,8,12-tetrakis[4,6-bis{N-(2,2,6,6-tetramethyl-4-piperidyl)butylamino}-1,3,5-triazin-2-yl]1,5,8,12-tetraazadodecane
II-19  condensate of 1,6-bis(2,2,6,6-tetramethyl-4-piperidylamino)hexane with 2-tert-octylamino 4,6-dichloro-s-triazine
II-20  condensate of 1,6-bis(2,2,6,6-tetramethyl-4-piperidylamino)hexane with 2-morpholino-4,6-dichloro-s-triazine
II-21  condensate of 1,6-bis(2,2,6,6-tetramethyl-4-piperidylamino)hexane with dibromoethane The hindered amine compound is used in an amount of 0.001 to 10 parts by weight, preferably 0.001 to 5 parts by weight, still preferably 0.01 to 3 parts by weight per 100 parts by weight of a synthetic resin.

The method for adding a phosphite compound represented by the general formula (I) and a hindered amine having a group represented by the general formula (II) to a synthetic resin is not particularly limited, but may be any conventional one.

Examples of the method include a method of dry blending powdery additives with a powder or pellet of a synthetic resin, a method of spraying a solution or melt of additives upon a powder or pellet of a synthetic resin and a method of mixing a dispersion of additives with a synthetic resin latex and salting out the obtained mixture.

Examples of the synthetic resin to be stabilized according to the present invention include α-olefin polymers such as polyethylene, polypropylene, polybutene and poly-3-methylbutene; polyolefins and olefin copolymers such as ethylene-vinyl acetate copolymers and ethylene-propylene copolymers; halogenaged synthetic resins such as polyvinyl chloride, polyvinyl bromide, polyvinyl fluoride, polyvinylidene chloride, chlorinated polyethylene, chlorinated polypropylene, polyvinylidene fluoride, brominated polyethylene, chlorinated rubber, vinyl chloridevinyl acetate copolymers, vinyl chloride-ethylene copolymers, vinyl chloride-propylene copolymers, vinyl chloride-styrene copolymers, vinyl chlorideisobutylene copolymers, vinyl chloride-vinylidene chloride copolymers, vinyl chloride-styrene-maleic anhydride terpolymers, vinyl chloride-styrene-acrylonitrile copolymers, vinyl chloride-butadiene copolymers, vinyl chloride-chloropropylene copolymers, vinyl chloride-vinylidene chloride-vinyl acetate terpolymers, vinyl chloride-acrylate copolymers, vinyl chloride-maleate copolymers, vinyl chloride-methacrylate copolymers and vinyl chloride-acrylonitrile copolymers; petroleum resin, coumarone resin, polystyrene, polyvinyl acetate, acrylic resin, polyacrylonitrile, copolymers comprising styrene and other monomers (such as maleic anhydride, butadiene or acrylonitrile), ABS resins, heat-resistant ABS resin corresponding to a resin obtained by replacing a part or the whole of the styrene components of ABS resin by α-methylstyrene, ultra-heat-resistant ABS resin corresponding to a resin obtained by further incorporating maleimide into ABS resin as a comonomer, acrylate-butadiene-styrene copolymers, methacrylate-butadiene-styrene copolymers, methacrylate resins such as polymethyl methacrylate, polyvinyl alcohol, polyvinyl formal, polyvinyl butyral, linear polyester, polyphenylene oxide, polyamide, polycarbonate, polyacetal, polyurethane, cellulosic resin, phenol resin, urea resin, melamine resin, epoxy resin, unsaturated polyester resin and silicone resins. Further, the synthetic resin to be stabilized according to the present invention includes rubbers such as isoprene rubber, butadiene rubber, acrylonitrile-butadiene rubber and styrene-butadiene rubber and blends of them.

The composition of the present invention may further contain a phenolic antioxidant to thereby further improve the oxidation stability. Examples of the phenolic antioxidant include 2,6-di-t-butyl-p-cresol, 2,6-diphenyl-4-octadecyloxyphenol, distearyl (3,5-di-t-butyl-4-hydroxybenzyl)phosphonate, stearyl β-(3,5-di-t-butyl-4-hydroxyphenyl)propionate, 4,4'-thiobis(6-t-butyl-m-cresol), 2-octylthio-4,6-di(3,5-dihydroxyphenoxy)-s-triazine, 2,2'-methylenebis(4-methyl-6-t-butylphenol), 2,2'-methylenebis(4-ethyl-6-t-butylphenol), glycol bis[3,3-bis(4-hydroxy-3-t-butylphenyl)butyrate], 4,4'-butylidenebis(6-t-butyl-m-cresol), 2,2'-ethylidenebis(4,6-di-t-butylphenol), 2,2'-ethylidenebis(4-sec-butyl-6-t-butylphenol), 2-tert-butyl-4-methyl-6-(2-acryloyloxy-3-tert-butyl-5-methylbenzyl)phenol, bis[2-tert-butyl-4-methyl-6-(2-hydroxy-3-tert-butyl-5-methylbenzyl)phenyl] terephthalate, hexamethylene bis[β-(3,5-di-t-butyl-4-hydroxyphenyl)propionate], thiodiethylene bis[β-(3,5-di-t-butyl-4-hydroxyphenyl)propionate], 3,6-dioxaoctane bis[β-(3-t-butyl-4-hydroxy-5-methylphenyl)propionate], N,N'-bis[β-(3,5-di-t-butyl-4-hydroxyphenyl)propionyl]hexamethylenediamine, 3,9-bis[1,1-dimethyl-2-{β-(3-tert-butyl-4-hydroxy-5-methylphenyl)propionyloxy}ethyl [-2,4,8,10-tetraoxaspiro[5.5]undecane, 1,1,3-tris-(2-methyl-4-hydroxy-5-t-butylphenyl)butane, 1,3,5-tris(2,6-dimethyl-3-hydroxy-4-t-butylbenzyl) isocyanurate, 1,3,5-tris(3,5-di-t-butyl-4-hydroxybenzyl) isocyanurate, 1,3,5-tris[β-(3,5-di-t-butyl-4-hydroxyphenyl)propionyloxyethyl] isocyanurate, 1,3,5-tris(3,5-di-t-butyl-4-hydroxybenzyl)-2,4,6-trimethylbenzene and tetrakis[methylene-β-(3,5-di-t-butyl-4-hydroxyphenyl)propionate]methane.

The composition of the present invention may further contain a sulfur antioxidant to improve the oxidation stability.

Examples of the sulfur antioxidant include dialkyl thiodipropionate such as dilauryl, dimyristyl or distearyl thiodipropionate; polyol β-alkylmercaptopropionate such as pentaerythritol tetra(β-dodecylmercaptopropionate) and spiro compounds such as 3,9-bis(β-dodecylmercaptoethyl)-2,4,8,10-tetraoxaspirol-[5.5]undecane.

The composition of the present invention may further contain an ultraviolet absorber to further improve the light resistance.

Examples of the ultraviolet absorber include 2-hydroxy-benzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2-hydroxyphenyl)benzotriazoles such as 2-(2-hydroxy-5-methylphenyl)benzotriazole, 2-(2-hydroxy-5-t-octylphenyl)benzotriazole, 2-(2-hydroxy-3,5-di-t-butylphenyl)benzotriazole, 2-(2-hydroxy-3,5-di-t-butylphenyl)-5-chlorobenzotriazole, 2-(2-hydroxy-3-t-butyl-5-methylphenyl)-5-chlorobenzotriazole, 2-(2-hydroxy-3,5-dicumylphenyl) benzotriazole and 2,2'-methylenebis(4-t-octyl-6-benzotriazolyl)phenol; benzoates such as phenyl salicylate, resorcinol monobenzoate, 2,4-di-t-butylphenyl 3,5-di-t-butyl-4-hydroxybenzoate and hexadecyl 3,5-di-t-butyl-4-hydroxybenzoate; substituted oxanilides such as 2-ethyl-2'-ethoxyoxanilide and 2-ethoxy-4'-dodecyloxanilide and cyanoacrylates such as ethyl α-cyano-β,β-diphenylacrylate and methyl 2-cyano-3-methyl-3-(p-methoxyphenyl)acrylate.

The composition of the present invention may further contain an inactivator for heavy metal, nuclearing agent, metal soap, pigment, filler, organotin compound, plasticizer, epoxy compound, blowing agent, antistatic agent, flame retardant, lubricant, processing aid or the like.

The present invention will now be described in more detail by referring to the following Examples, though it is not limited by them.

EXAMPLE 1

A composition having a formulation which will be described below was extruded at 280° C. into pellets. The pellets were injected into a test piece having a thickness of 1 mm at 250° C.

This test piece was examined for heat resistance in an oven at 160° C. Further, the test piece was irradiated in a Sunshine Weatherometer at a black panel temperature of 83° C. to determine the weathering resistance.

The results are shown in Table 1.

| <Formulation> | |
|---|---|
| polypropylene (Profax 6501) | 100 parts by weight |
| calcium stearate | 0.05 |
| tetrakis [methylene-β-(3,5-di-t-butyl-4-hydroxyphenyl)propionate]-methane | 0.1 |
| Compound I-4 | 0.1 |
| sample compound | 0.1 parts by weight |

TABLE 1

| No. | Sample compound | Heat resistance | Weathering resistance |
|---|---|---|---|
| Comp. Ex. | | | |
| 1-1 | not used (I-4; not used) | 240$^{hr}$ | 120$^{hr}$ |
| 1-2 | not used | 336 | 150 |
| 1-3 | II-4 (I-4; not used) | 240 | 720 |
| Example | | | |
| 1-1 | II-3 | 456 | 1020 |
| 1-2 | II-4 | 444 | 960 |
| 1-3 | II-7 | 480 | 960 |
| 1-4 | II-12 | 492 | 1020 |
| 1-5 | II-16 | 432 | 930 |
| 1-6 | II-19 | 456 | 900 |
| 1-7 | II-21 | 444 | 930 |

EXAMPLE 2

A composition having a formulation which will be described below was processed in a similar manner to that described in Example 1 to obtain a test piece. This test piece was examined in a similar manner to that described in Example 1. The results are shown in Table 2.

| <Formulation> | |
|---|---|
| polypropylene (Profax 6501) | 100 parts by weight |
| calcium stearate | 0.05 |
| tetrakis[methylene-β-(3,5-di-t-butyl-4-hydroxyphenyl)propionate]-methane | 0.1 |
| Compound II-7 | 0.1 |
| sample compound | 0.1 |

TABLE 2

| No. | Sample compound | Heat resistance | Weathering resistance |
|---|---|---|---|
| Comp. Ex. | | | |
| 2-1 | not used (II-7; not used) | 240$^{hr}$ | 120$^{hr}$ |
| 2-2 | not used | 300 | 660 |
| 2-3 | I-4 (II-7; not used) | 336 | 150 |
| 2-4 | comparative compound 1*[1] | 324 | 720 |
| 2-5 | comparative compound 2*[2] | 360 | 750 |
| Example | | | |
| 2-1 | I-1 | 456 | 930 |
| 2-2 | I-2 | 444 | 930 |
| 2-3 | I-3 | 480 | 960 |
| 2-4 | I-4 | 480 | 960 |
| 2-5 | I-5 | 468 | 960 |
| 2-6 | I-6 | 468 | 930 |
| 2-7 | I-7 | 432 | 900 |
| 2-8 | I-8 | 444 | 930 |
| 2-9 | I-9 | 468 | 960 |
| 2-10 | I-10 | 468 | 930 |

*[1]: comparative compound 1

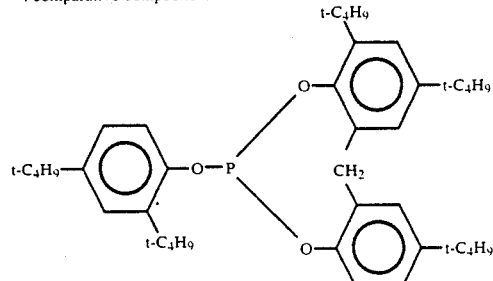

*[2]: comparative compound 2

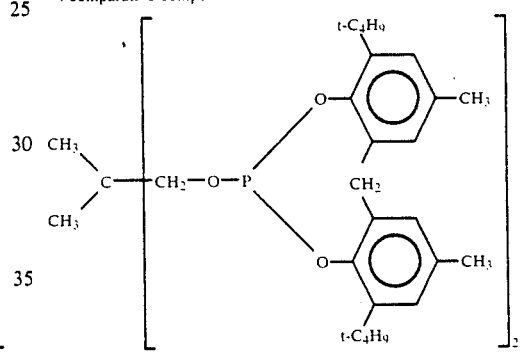

EXAMPLE 3

In order to determine the effect of a case wherein an ultraviolet absorber is simultaneously used, a composition having a formulation which will be described below was processed in a similar manner to that described in Example 1 to obtain a test piece.

This test piece was examined for weathering resistance in a Sunshine Weatherometer.

The results are shown in Table 3.

| <Formulation> | |
|---|---|
| polypropylene (Profax 6501) | 80 parts by weight |
| calcium stearate | 0.05 |
| tetrakis[methylene-β-(3,5-di-t-butyl-4-hydroxyphenyl)propionate]-methane | 0.1 |
| Compound I-5 | 0.1 |
| Compound II-4 | 0.1 |
| ultraviolet absorber | 0.1 |

TABLE 3

| No. | Ultraviolet absorber | Weathering resistance |
|---|---|---|
| Comp. Ex. | | |
| 3-1 | not used (II-4; not used) | 150$^{hr}$ |
| 3-2 | 2-(2-hydroxy-3-t-butyl-5-methyl-phenyl)-5-chlorobenzotriazole (II-4; not used) | 420 |
| 3-3 | 2-(2-hydroxy-3-t-butyl-5-methyl- | 510 |

TABLE 3-continued

| No. | Ultraviolet absorber | Weathering resistance |
|---|---|---|
|  | phenyl)-5-chlorobenzotriazole (0.2 part, II-4; not used) |  |
| Example |  |  |
| 3-1 | not used | 960 |
| 3-2 | not used (II-4, 0.2 part) | 1080 |
| 3-3 | 2-hydroxy-4-octoxybenzophenone | 1230 |
| 3-4 | 4,4'-methylenebis(2-benzoyl-5-methoxyphenol) | 1320 |
| 3-5 | 2-(2-hydroxy-5-methylphenyl)-benzotriazole | 1230 |
| 3-6 | 2-(2-hydroxy-3-t-butyl-5-methyl-phenyl)-5-chlorobenzotriazole | 1470 |
| 3-7 | 2,2'-methylenebis(4-t-butyl-6-benzotriazol-2-yl)phenol | 1470 |

EXAMPLE 4

A composition having a formulation which will be described below was mixed in a Brabender Plastograph under the condition of 230° C. and 80 rpm to determine the carbonyl index (CI). Separately, a composition having a formulation which will be described below was kneaded and pressed into a test piece having a thickness of 0.1 mm. This test piece was examined for weathering resistance in a Weatherometer.

The results are shown in Table 4.

| <Formulation> | |
|---|---|
| low-density polyethylene | 100 parts by weight |
| stearyl β-(3,5-di-t-butyl-4-hydroxyphenyl)propionate | 0.03 |
| Compound I-5 | 0.05 |
| sample compound | 0.2 |

TABLE 4

| No. | Sample compound | CI | Weathering resistance |
|---|---|---|---|
| Comp. Ex. |  |  |  |
| 4-1 | not used (I-5; not used) | 1.25 | 120$^{hr}$ |
| 4-2 | not used | 1.20 | 150 |
| 4-3 | II-4 (I-5; not used) | 1.20 | 780 |
| Example |  |  |  |
| 4-1 | Compound II-2 | 0.95 | 1020 |
| 4-2 | Compound II-4 | 1.00 | 1020 |
| 4-3 | Compound II-7 | 0.90 | 1260$^{hr}$ |
| 4-4 | Compound II-10 | 0.95 | 1200 |
| 4-5 | Compound II-19 | 1.05 | 1140 |
| 4-6 | Compound II-21 | 1.00 | 1140 |

EXAMPLE 5

A composition having a formulation which will be described below was extruded at 260° C. to obtain pellets. The pellets were injected at 280° C. into a test piece having a thickness of 1 mm. This test piece was heated in an oven at 110° C. for 24 hours to determine the color difference. Separately, the same test piece as that used above was irradiated in a Sunshine Weatherometer (without raining) for 400 hours to determine the color difference.

The results are shown in Table 5.

| <Formulation> | |
|---|---|
| heat resistant ABS resin (α-methylstyrene copolymer type) | 100 parts by weight |
| magnesium stearate | 0.4 |

| <Formulation> | |
|---|---|
| tris(3,5-di-t-butyl-4-hydroxybenzyl)-isocyanurate | 0.2 |
| 2-(2-hydroxy-3-t-butyl-5-methyl-phenyl)-5-chlorobenzotriazole | 0.3 |
| titanium dioxide | 1 |
| Compound I-4 | 0.2 |
| sample compound | 0.5 |

TABLE 5

| No. | Sample compound | Color difference before irradiation | Color difference after irradiation |
|---|---|---|---|
| Comp. Ex. |  |  |  |
| 5-1 | not used (I-4; not used) | 15.0 | 7.8 |
| 5-2 | not used | 8.5 | 7.5 |
| 5-3 | Compound II-4 (I-4; not used) | 14.8 | 4.0 |
| Example |  |  |  |
| 5-1 | Compound II-3 | 7.3 | 1.5 |
| 5-2 | Compound II-4 | 7.4 | 2.0 |
| 5-3 | Compound II-7 | 7.1 | 1.4 |
| 5-4 | Compound II-8 | 7.0 | 1.4 |
| 5-5 | Compound II-10 | 7.4 | 1.6 |
| 5-6 | Compound II-11 | 7.3 | 1.5 |
| 5-7 | Compound II-16 | 7.5 | 2.1 |
| 5-8 | Compound II-20 | 7.4 | 1.8 |

EXAMPLE 6

A composition having a formulation which will be described below was extruded at 280° C. to obtain pellets. The pellets were injected at 280° C. into a test piece having a thickness of 1 mm.

This test piece was heated in an oven at 120° C. for two weeks to determine the ratio of the Izod impact strength after the heating to that therebefore (retention of Izod impact strength). Separately, the same test piece as that used above was iradiated in fadeometer (63° C.) for 200 hours in a state placed under a glass plate for windowpane having a thickness of 2 mm to determine the color difference.

The results are shown in Table 6.

| <Formulation> | |
|---|---|
| polyphenylene oxide resin | 45 parts by weight |
| impact-resistant polystyrene | 55 |
| Compound I-4 | 1 |
| sample compound | 2 |

TABLE 6

| No. | Sample compound | Retention of impact strength | Color difference |
|---|---|---|---|
| Comp. Ex. |  |  |  |
| 6-1 | not used (I-4; not used) | 31% | 22.1 |
| 6-2 | not used | 82 | 19.3 |
| 6-3 | not used | | |
| 6-3 | Compound II-4 (I-4; not used) | 33 | 7.8 |
| Example |  |  |  |
| 6-1 | Compound II-3 | 90 | 2.2 |
| 6-2 | Compound II-4 | 92 | 2.2 |
| 6-3 | Compound II-7 | 94 | 2.0 |
| 6-4 | Compound II-8 | 94 | 1.9 |
| 6-5 | Compound II-10 | 91% | 2.2 |
| 6-6 | Compound II-11 | 92 | 2.1 |

TABLE 6-continued

| No. | Sample compound | Retention of impact strength | Color difference |
| --- | --- | --- | --- |
| 6-7 | Compound II-16 | 94 | 1.9 |
| 6-8 | Compound II-20 | 88 | 2.4 |

What is claimed is:

1. A stabilized synthetic resin composition comprising 100 parts by weight of a synthetic resin, 0.001 to 10 parts by weight of a phosphite compound represented by the following formula (I) and 0.001 to 10 parts by weight of a hindered amine compound having a group represented by the following formula (II) in its molecule:

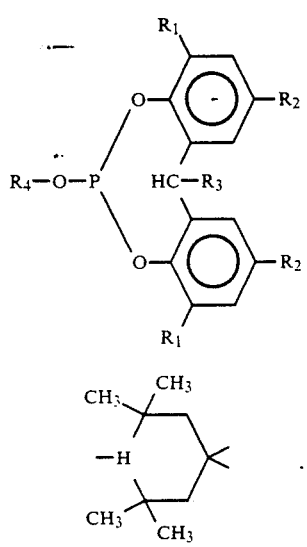

wherein $R_1$ stands for a tert-butyl or tert-amyl group; $R_2$ stands for a $C_{1-9}$ alkyl group; $R_3$ stands for a hydrogen atom or a $C_{1-4}$ alkyl group and $R_4$ stands for a $C_{1-30}$ alkyl group.

2. The stabilized synthetic resin composition as set forth in claim 1, where the hindered amine compound is a carboxylic acid ester of 2,2,6,6-tetramethyl-4-piperidinol.

3. The stabilized synthetic resin composition as set forth in claim 1, where the hindered amine compound is bis (2,2,6,6-tetramethyl-4-piperidyl)sebacate.

4. The stabilized synthetic resin composition as set forth in claim 1, where the hindered amine compound is tetrakis(2,2,6,6-tetramethyl-4-piperidyl)-1,2,3,4-butanetetracarboxylate.

5. The stabilized synthetic resin composition as set forth in claim 1, where the compound represented by the formula (I) is 2,2'-methylenbis(4,6-di-t-butyl-phenyl)-2-ethylhexylphosphite.

6. The stabilized synthetic resin composition as set forth in claim 1, wherein $R_2$ is a $C_{1-9}$ alkyl group selected from the group consisting of methyl, ethyl, propyl, isopropyl, butyl, sec-butyl, tert-butyl, isobutyl, amyl, tert-amyl, hexyl, heptyl, octyl, isooctyl, 2-ethylhexyl, tert-octyl, nonyl and tert-nonyl.

7. The stabilized synthetic resin composition as set forth in claim 1, wherein $R_3$ in a $C_{1-4}$ alkyl group selected from the group consisting of methyl, ethyl, propyl, isopropyl, butyl, sec-butyl, tert-butyl and isobutyl.

8. The stabilized synthetic resin composition as set forth in claim 1, wherein $R_4$ is a $C_{1-30}$ alkyl group selected from the group consisting of methyl, ethyl, propyl, isopropyl, butyl, sec-butyl, tert-butyl, isobutyl, amyl, tert-amyl, hexyl, heptyl, octyl, isooctyl, 2-ethylhexyl, tert-octyl, nonyl, tert-nonyl, decyl, isodecyl, dodecyl, tetradecyl, hexadecyl, octadecyl, eicosyl, docosyl, tetracosyl and triacontyl.

9. The stabilized synthetic resin composition as set forth in claim 1, wherein the compound of formula (I) is selected from the group consisting of

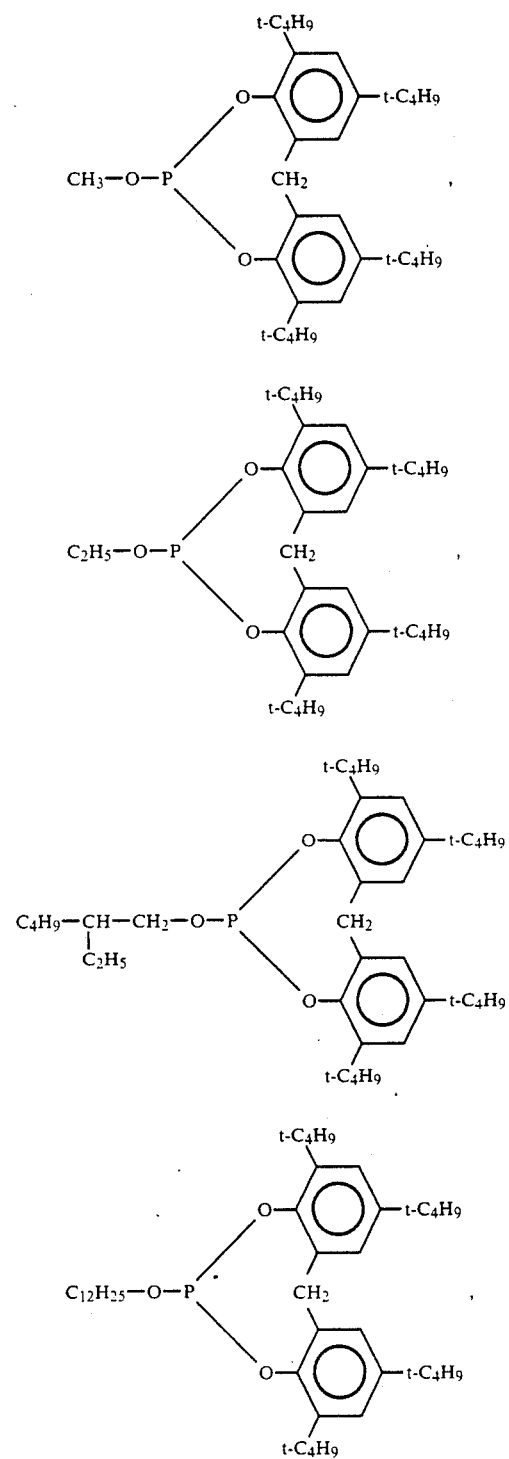

-continued

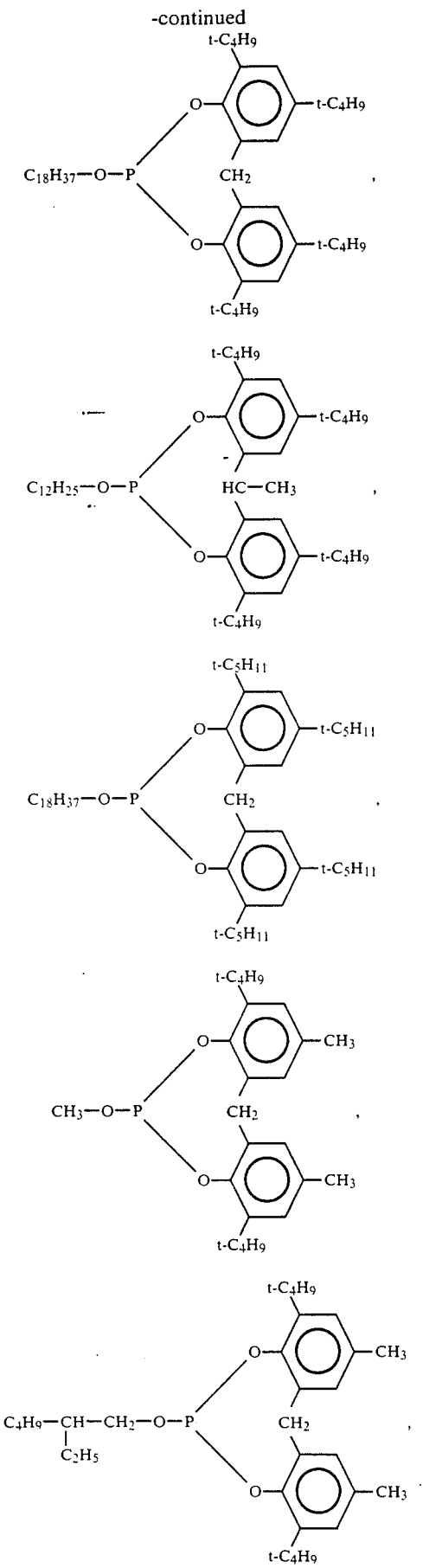

-continued and

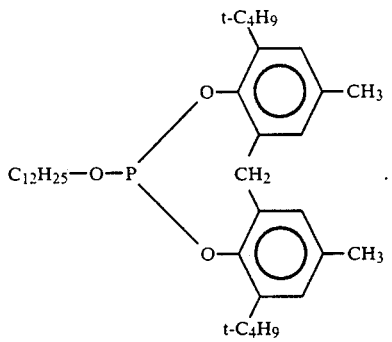

10. The stabilized synthetic resin composition as set forth in claim 1, wherein the phosphite compound is in an amount of 0.01 to 3 parts by weight per 100 parts by weight of the synthetic resin.

11. The stabilized synthetic resin composition as set forth in claim 1, wherein the hindered amine compound is selected from the group consisting of
2,2,6,6-tetramethyl-4-piperidyl benzoate,
2,2,6,6-tetramethyl-4-piperidyl stearate,
1,2,2,6,6-pentamethyl-4-piperidyl stearate,
bis(2,2,6,6-tetramethyl-4-piperidyl) sebacate,
bis(1,2,2,6,6-pentamethyl-4-piperidyl) sebacate,
bis(1,2,2,6,6-pentamethyl-4-piperidyl) 2-butyl -2-(3,5-di-t-butyl-4-hydroxybenxyl)malonate,
tetra(2,2,6,6-tetramethyl-4-piperidyl) 1,2,3,4-butanetetracarboxylate,
tetra(1,2,2,6,6-pentamethyl-4-piperidyl) 1,2,3,4-butanetetracarboxylate,
bis(2,2,6,6-tetramethyl-4-piperidyl) di(tridecyl) 1,2,3,4-butanetetracarboxylate,
bis(1,2,3,6,6-pentamethyl-4-piperidyl) di(tridecyl) 1,2,3,4-butanetetracarboxylate,
3,9-bis[1,1-dimethyl-2-}2,3,4-tris(2,2,6,6-tetramethyl-4-piperidyloxycarbonyl)butylcarbonyloxy}ethyl]-2,4,8,10-tetraoxaspiro -]5.5]undecane,
3,9-bis[1,1-dimethyl-2-{2,3,4-tris(1,2,3,6,6-pentamethyl-4-piperidyloxycarbonyl)butylcarbonyloxy}ethyl]-2,4,8,10-tetraoxaspiro-[5.5]undecane,
1-[2-{β-(3,5-di-t-butyl-4-hydroxyphenyl) propionyloxy}ethyl]-2,2,6,6-tetramethyl-4-piperidyl β-(3,5-di-t-butyl-4-hydroxyphenyl) propionate,
condensate of 1-(2-hydroxyethyl)-2,2,6,6-tetramethyl-4-piperidinol with dimethyl succinate,
N-(2,2,6,6-tetramethyl-4-piperidyl)-2-(2,2,6,6-tetramethyl-4-piperidylamino)isobutyramide,
N-(2,2,6,6-tetramethyl-4-piperidyl)dodecylsuccinimide,
1,6-bis(2,2,6,6-tetramethyl-4-piperidylamino)hexane,
1,5,8,12-tetrakis[4,6-bis{N-(2,2,6,6-tetramethyl -4-piperidyl)butylamino}-1,3,5-triazin-2-yl]-1,5,8,12-tetraazadodecane,
condensate of 1,6-bis(2,2,6,6-tetramethyl-4-piperidylamino)hexane with 2-tert-octylamino -4,6-dichloro-s-triazine,
condensate of 1,6-bis(2,2,6,6-tetramethyl-4-piperidylamino)hexane with 2-morpholino-4,6-dichloro-s-triazine, and
condensate of 1,6-bis(2,2,6,6-tetramethyl-4-piperidylamino)hexane with dibromoethane.

12. The stabilized synthetic resin composition as set forth in claim 1, whrein the hindered amine compound is in an amount of 0.001 to 5 parts by weight per 100 parts by weight of the synthetic resin.

13. The stabilized synthetic resin composition as set forth in claim 1, wherein the hindered amine compound is in an amount of 0.01 to 3 parts by weight per 100 parts by weight of the synthetic resin.

14. The stabilized synthetic resin composition as set forth in claim 1, which further comprises an antioxidant selected from the group consisting of a phenolic antioxidant, and a sulfur antioxidant.

15. The stabilized synthetic resin composition as set forth in claim 1, which further comprises an ultraviolet absorber.

16. The stabilized synthetic resin composition as set forth in claim 1, wherein the synthetic resin is selected from the group consisting of α-olefin polymers, polyolefins, olefin copolymers, halogenated synthetic resins, petroleum resin, coumarone resin, polystyrene, polyvinyl acetate, acrylic resin, polyacrylonitrile, copolymers comprising styrene and other monomers, ABS resins, a heat-resistant ABS resin corresponding to a resin obtained by replacing a part or the whole of the styrene components of an ABS resin by α-methylstyrene, an ultra-heat-resistant ABS resin corresponding to a resin obtained by further incorporating maleimide into an ABS resin as a comonomer, acrylate-butadiene-styrene copolymers, methacrylate-butadiene-styrene copolymers, methacrylate resins, polyvinyl alcohol, polyvinyl formal, polyvinyl butyral, linear polyester, polyphenylene oxide, polyamide, polycarbonate, polyacetal, polyurethane, cellulosic resin, phenol resin, urea resin, melamine resin, epoxy resin, unsaturated polyester resin, silicone resins and rubbers.

17. The stabilized synthetic resin composition as set forth in claim 1, wherein the synthetic resin is selected from the group consisting of polyethylene, polypropylene, polybutene, poly-3-methylbutene, ethylene-vinyl acetate copolymers, ethylenepropylene copolymers, polyvinyl chloride, polyvinyl bromide, polyvinyl fluoride, polyvinylidene chloride, chlorinated polyethylene, chlorinated polypropylene, polyvinylidene fluoride, brominated polyethylene, chlorinated rubber, vinyl chloride-vinyl acetate copolymers, vinyl chloride-ethylene copolymers, vinyl chloride-propylene copolymers, vinyl chloride-styrene copolymers, vinyl chloride-isobutylene copolymers, vinyl chloride-vinylidene chloride copolymers, vinyl chloride-styrene-maleic anhydride terpolymers, vinyl chloride-styrene-acrylonitrile copolymers, vinyl chloride-butadiene copolymers, vinyl chloridechloropropylene copolymers, vinyl chloride-vinylidene chloridevinyl acetate terpolymers, vinyl chloride-acrylate copolymers, vinyl chloride-maleate copolymers, vinyl chloride-methacrylate copolymers, vinyl chloride-acrylonitrile copolymers, isoprene rubber, butadiene rubber, acrylonitrile-butadiene rubber and styrene-butadiene rubber.

18. The stabilized synthetic resin composition as set forth in claim 1, wherein the synthetic resin is polypropylene, the phosphite compound is

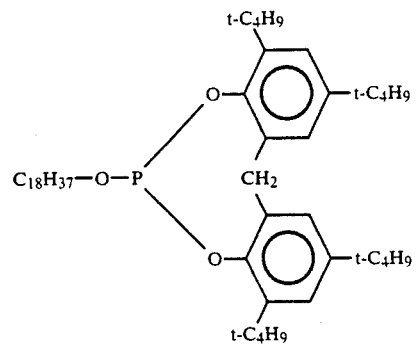

and the hindered amine compound is selected from the group consisting of 1,2,2,6,6-pentamdehyl-4-piperidyl stearate, bis(2,2,6,6-tetramethyl-4-piperidyl) sebacate, tetra(2,2,6,6-tetramethyl-4-piperidyl) 1,2,3,4-butanetetracarboxylate, 3,9-bis[1,1-dimethyl-2-{2,3,4-tris(1,2,2,6,6-pentamethyl-4-piperidyloxycarbonyl)butylcarbonyloxy}ethyl]-2,4,8,10-tetraoxaspiro -[5.5]undecane, N-(2,2,6,6-tetramethyl-4-piperidyl)dodecylsuccinimide, condensate of 1,6-bis(2,2,6,6-tetramethyl-4-piperidylamino)hexane with 2-tert-octylamino -4,6-dichloro-s-triazine, and condensate of 1,6-bis(2,2,6,6-tetramethyl-4-piperidylamino)hexane with dibromoethane.

19. The stabilized synthetic resin composition as set forth in claim 1, wherein the synthetic resin is polypropylene, the hindered amine compound is tetra(2,2,6,6-tetramethyl-4-piperidyl)1,2,3,4-butanetetracarboxylate and the phosphite compound is selected from the group consisting of

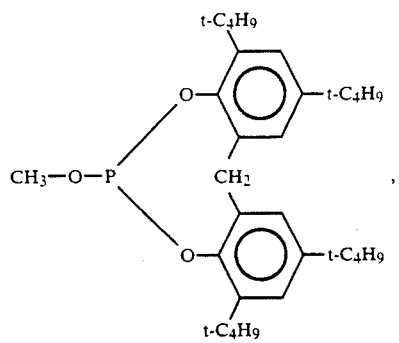

,

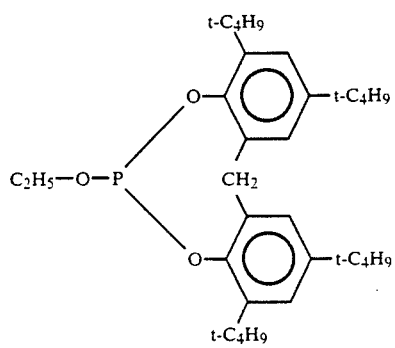

,

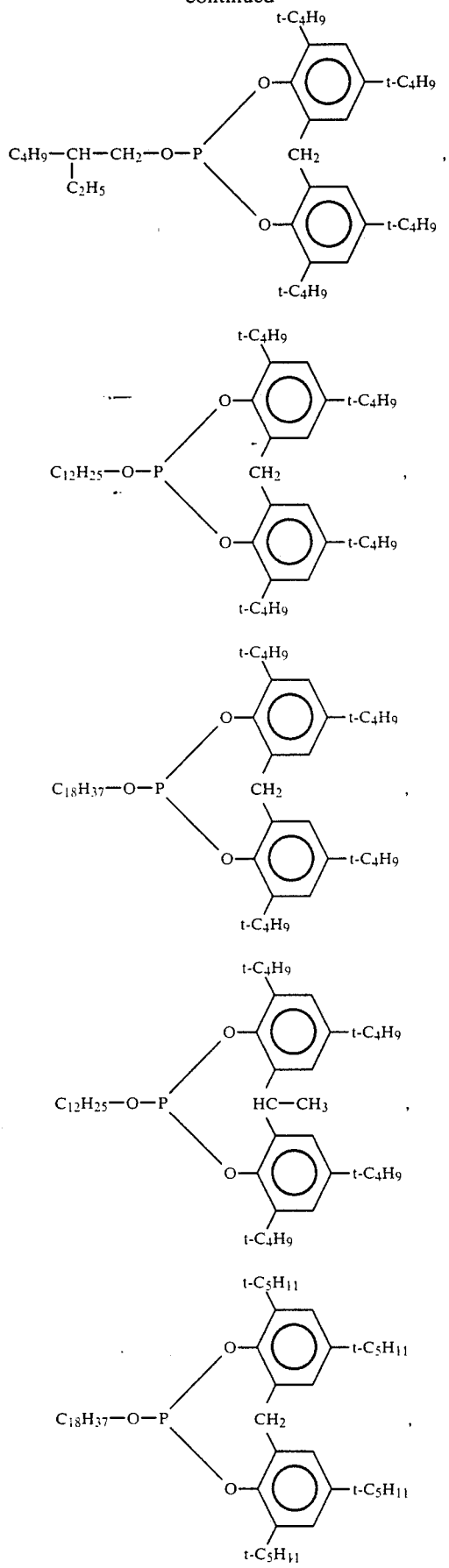
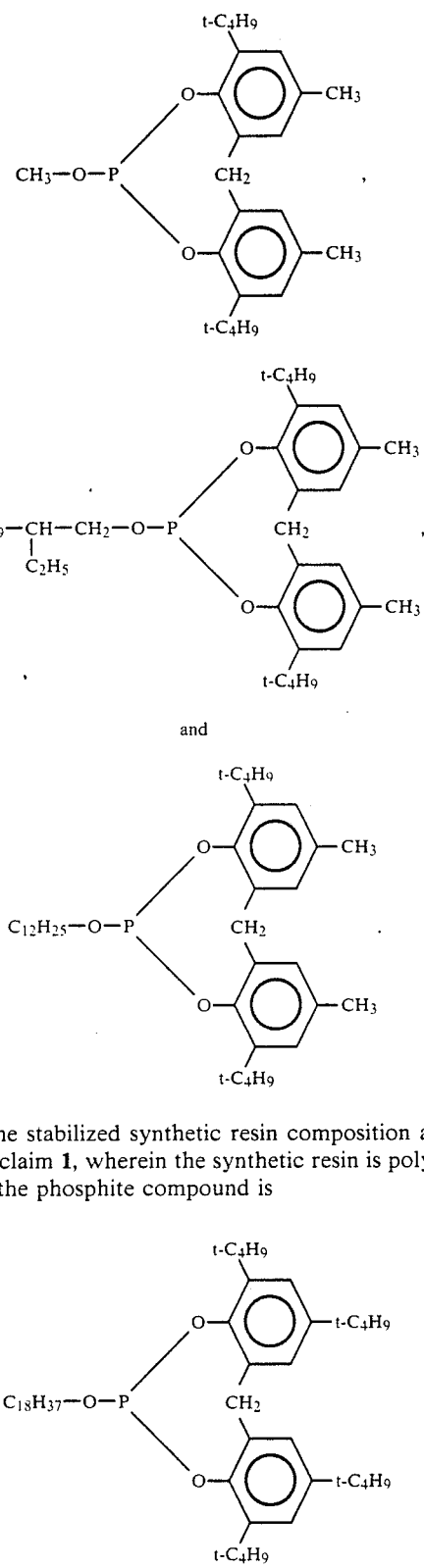
20. The stabilized synthetic resin composition as set forth in claim 1, wherein the synthetic resin is polypropylene, the phosphite compound is
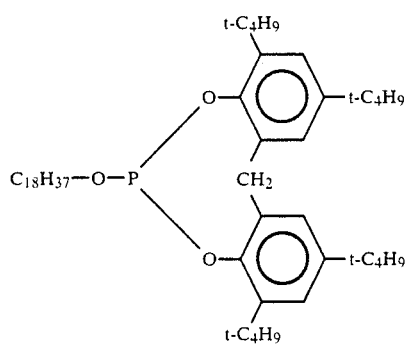
and the hindered amine compound is bis(2,2,6,6-tetramethyl-4-piperidyl) sebacate.
21. The stabilized synthetic resin composition as set forth in claim 1, wherein the synthetic resin is polyethylene, the phosphite compound is

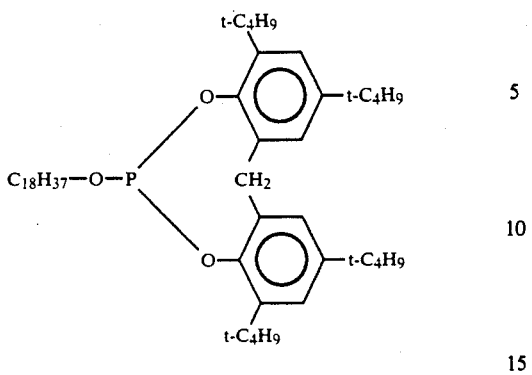

and the hindered amine compound is selected from the group consisting of
- tetra(2,2,6,6-tetramethyl-4-piperidyl) 1,2,3,4-butanetetracarboxylate,
- bis(1,2,2,6,6-pentamethyl-4-piperidyl) di(tridecyl) 1,2,3,4-butanetetracarboxylate,
- condensate of 1,6-bis(2,2,6,6-tetramethyl-4-piperidylamino)hexane with 2-tert-octylamino -4,6-dichloro-s-triazine, and
- condensate of 1,6-bis(2,2,6,6-tetramethyl-4-piperidylamino)hexane with dibromoethane.

22. The stabilized synthetic resin composition as set forth in claim 1, wherein the synthetic resin is a heat-resistant ABS resin of an α-methyl styrene copolymer type, the phosphite compound is

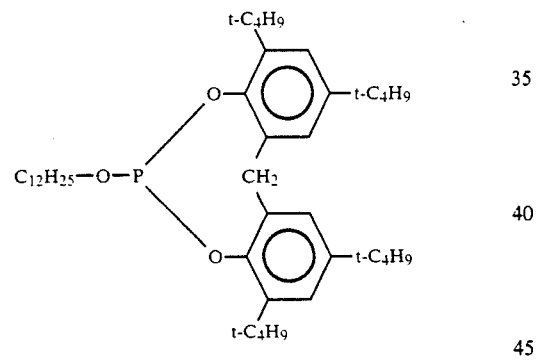

and the hindered amine compound is selected from the group consisting of
- 1,2,2,6,6-pentamethyl-4-piperidyl stearate, bis(2,2,6,6-tetramethyl-4-piperidyl) sebacate, tetra(2,2,6,6-tetramethyl-4-piperidyl) 1,2,3,4-butanetetracarboxylate,
- tetra(1,2,2,6,6-pentamethyl-4-piperidyl) 1,2,3,4-butanetetracarboxylate,
- bis(1,2,2,6,6-pentamethyl-4-piperidyl) di(tridecyl) 1,2,3,4-butanetetracarboxylate,
- 3,9-bis[1,1-dimethyl-2-{2,3,4-tris(2,2,6,6-tetramethyl-4-piperidyloxycarbonyl)butyl carbonyloxy)ethyl]-2,4,8,10-tetraoxaspiro -[5.5]undecane,
- N-(2,2,6,6-tetramethyl-4-piperidyl)dodecylsuccinimide, and
- condensate of 1,6-bis(2,2,6,6-tetramethyl-4-piperidylamino)hexane with 2-morpholino-4,6-dichloro-s-triazine.

23. The stabilized synthetic resin composition as set forth in claim 1, wherein the synthetic resin comprises polyphenylene oxide resin and polystyrene, the phosphite compound is

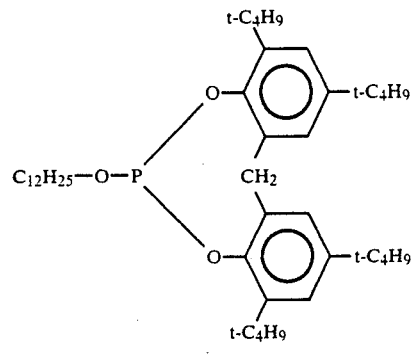

and the hindered amine compound is selected from the group consisting of
- 1,2,2,6,6-pentamethyl-4-piperidyl stearate, bis(2,2,6,6-tetramethyl-4-piperidyl) sebacate, tetra(2,2,6,6-tetramethyl-4-piperidyl) 1,2,3,4-butanetetracarboxylate,
- tetra(1,2,2,6,6-pentamethyl-4-piperidyl) 1,2,3,4-butanetetracarboxylate,
- bis(1,2,2,6,6-pentamethyl-4-piperidyl) di(tridecyl) 1,2,3,4-butanetetracarboxylate,
- 3,9-bis[1,1-dimethyl-2-{2,3,4-tris(2,2,6,6-tetramethyl-4-piperidyloxycarbonyl)butylcarbonyloxy}ethyl]-2,4,8,10-tetraoxaspiro -[5.5]undecane,
- N-(2,2,6,6-tetramethyl-4-piperidyl)dodecylsuccinimide, and
- condensate of 1,6-bis(2,2,6,6-tetramethyl-4-piperidylamino)hexane with 2-morpholino-4,6-dichloro-s-triazine.

24. The stabilized synthetic resin composition as set forth in claim 1, wherein the synthetic resin is polypropylene, the phosphite compound is selected from the group consisting of

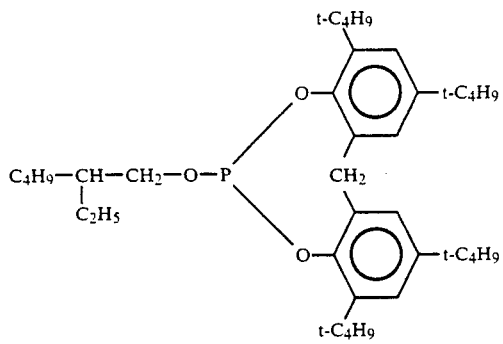

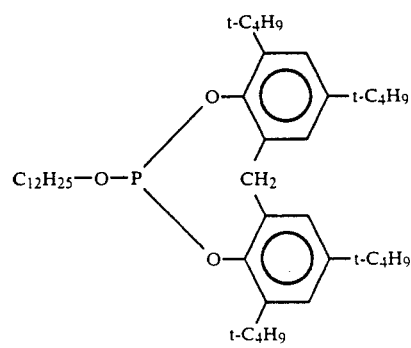

and

-continued
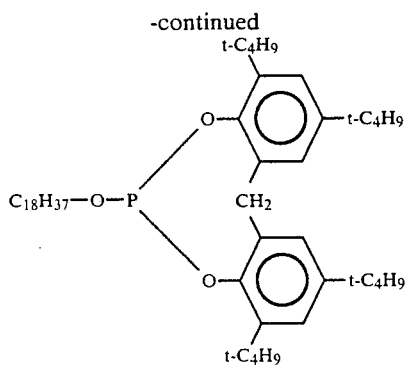
and the hindered amine compound is selected from the group consisting of
bis(2,2,6,6-tetramethyl-4-piperidyl) sebacate and tetra(2,2,6,6-tetramethyl-4-piperidyl) 1,2,3,4-butanetetracarboxylate.
* * * * *